US011631099B2

(12) United States Patent
Burrell et al.

(10) Patent No.: US 11,631,099 B2
(45) Date of Patent: Apr. 18, 2023

(54) SYSTEM FOR RECURRING AUXILIARY RESOURCE DISTRIBUTION

(71) Applicant: Bank of America Corporation, Charlotte, NC (US)

(72) Inventors: Charles Jason Burrell, Middleburg, FL (US); Justin Riley duPont, Charlotte, NC (US); Michael Robert Hasslinger, Huntersville, NC (US); John Allen Sellers, Kennett Square, PA (US); Tony England, Tega Cay, SC (US); Christina Ann Lillie, Saline, MI (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 138 days.

(21) Appl. No.: 16/933,280

(22) Filed: Jul. 20, 2020

(65) Prior Publication Data
US 2022/0020046 A1 Jan. 20, 2022

(51) Int. Cl.
*G06Q 30/0207* (2023.01)
*G06Q 20/10* (2012.01)
*G06Q 20/36* (2012.01)
*G06Q 40/02* (2023.01)
*G06Q 30/0226* (2023.01)

(52) U.S. Cl.
CPC ....... *G06Q 30/0215* (2013.01); *G06Q 20/102* (2013.01); *G06Q 20/3676* (2013.01); *G06Q 20/3678* (2013.01); *G06Q 30/0233* (2013.01); *G06Q 40/02* (2013.01)

(58) Field of Classification Search
CPC .. G06Q 30/0215; G06Q 20/381; G06Q 40/02; G06Q 20/102; G06Q 20/3676–3678; G06Q 30/0233
See application file for complete search history.

(56) References Cited

U.S. PATENT DOCUMENTS

| | | |
|---|---|---|
| 8,108,272 B2 | 1/2012 | Sorbe et al. |
| 8,392,330 B2 | 3/2013 | Sorbe et al. |
| 8,589,295 B2 | 11/2013 | Sorbe et al. |
| 8,788,414 B2 | 7/2014 | Sorbe et al. |
| 9,235,831 B2 | 1/2016 | Rolf |
| 10,002,354 B2 | 6/2018 | Digrigoli et al. |
| 10,002,366 B2 | 6/2018 | Beyer |

(Continued)

*Primary Examiner* — Eric T Wong
(74) *Attorney, Agent, or Firm* — Moore & Van Allen PLLC; R. W. McCord Rayburn

(57) ABSTRACT

Systems, computer program products, and methods are described herein for recurring auxiliary resource distribution. The present invention may be configured to detect a trigger event associated with a plurality of sources, where the plurality of sources includes a standard source and an auxiliary source, and where the plurality of sources is associated with a user. The present invention may be configured to transform, using a resource transformation engine and based on the trigger event, a first amount of auxiliary resources in the auxiliary source to a second amount of standard resources, deduct the first amount of auxiliary resources from a first balance of the auxiliary source, and add the second amount of standard resources to a second balance of the standard source. The present invention may be configured to perform a resource distribution using the second amount of standard resources from the standard source.

20 Claims, 2 Drawing Sheets

(56) References Cited

U.S. PATENT DOCUMENTS

| | | | |
|---|---|---|---|
| 10,068,208 B2 | 9/2018 | Sorbe et al. | |
| 10,147,140 B1 | 12/2018 | Magnolia et al. | |
| 10,515,405 B2 | 12/2019 | Sorbe | |
| 10,521,814 B1 | 12/2019 | Collins et al. | |
| 11,170,398 B1 * | 11/2021 | Goldstein | G06Q 30/0228 |
| 2005/0065883 A1 * | 3/2005 | Dent | G06Q 20/04 |
| | | | 705/40 |
| 2012/0296720 A1 | 11/2012 | Pirillo | |
| 2014/0156480 A1 * | 6/2014 | Qaim-Maqami | G06Q 20/405 |
| | | | 705/35 |
| 2019/0180255 A1 * | 6/2019 | Deshpande | G06N 20/00 |
| 2020/0257561 A1 * | 8/2020 | Ortiz | G06F 9/451 |

\* cited by examiner

SYSTEM FOR RECURRING AUXILIARY RESOURCE DISTRIBUTION

FIELD OF THE INVENTION

The present invention embraces a system for recurring auxiliary resource distribution.

BACKGROUND

An entity may provide auxiliary resources to a user for utilizing standard resources from a standard source associated with the entity to complete a resource distribution. The auxiliary resources may be associated with an auxiliary source associated with the user and maintained by the entity. However, tracking and maintaining auxiliary resources and auxiliary sources consumes computing resources (e.g., processing resources, memory resources, power resources, communication resources, and/or the like) and/or network resources. Accordingly, when auxiliary resources are not utilized by users, the computing resources and/or network resources consumed tracking and maintaining the auxiliary resources and auxiliary sources are wasted.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for recurring auxiliary resource distribution is presented. The system comprises: at least one non-transitory storage device; and at least one processing device coupled to the at least one non-transitory storage device, wherein the at least one processing device is configured to: detect a trigger event associated with a plurality of sources, wherein the plurality of sources comprises a standard source and an auxiliary source, and wherein the plurality of sources is associated with a user; transform, using a resource transformation engine and based on the trigger event, a first amount of auxiliary resources in the auxiliary source to a second amount of standard resources; deduct the first amount of auxiliary resources from a first balance of the auxiliary source; add the second amount of standard resources to a second balance of the standard source; and perform a resource distribution using the second amount of standard resources from the standard source.

In some embodiments, the trigger event comprises the first balance of the auxiliary source satisfying a threshold.

In some embodiments, the trigger event comprises a period of time having elapsed since a previous trigger event.

In some embodiments, the trigger event comprises the user receiving a resource distribution request.

In some embodiments, the at least one processing device is configured to, when transforming the first amount of auxiliary resources in the auxiliary source to the second amount of standard resources, multiply the first amount by a fraction to determine the second amount.

In some embodiments, the trigger event comprises the user receiving a resource distribution request for the second amount of standard resources from an entity, and the at least one processing device is configured to, when performing the resource distribution using the second amount of standard resources from the standard source: distribute the second amount of standard resources from the standard source to the entity; and deduct the second amount of standard resources from the second balance of the standard source.

In some embodiments, the at least one processing device is configured to, when performing the resource distribution using the second amount of standard resources from the standard source, distribute the second amount of standard resources from the standard source to another user.

In some embodiments, the auxiliary source is a rewards account, and the standard source is a deposit account.

In some embodiments, the at least one processing device is configured to receive user input identifying the trigger event and the first amount.

In some embodiments, the at least one processing device is configured to: receive user input identifying a threshold for the first balance of the auxiliary source and a source associated with a recipient user, the trigger event comprises the first balance satisfying the threshold, and the at least one processing device is configured to, when performing the resource distribution using the second amount of standard resources from the standard source, distribute the second amount of standard resources from the standard source to the source associated with recipient user.

In some embodiments, the resource distribution is a first resource distribution, and the at least one processing device is configured to: identify, based on historical data of resource distributions from the standard source, a recurring resource distribution that is repeated at a first frequency for a recurring amount; determine, based on historical data of the first balance of the auxiliary source, a second frequency and a predicted amount of standard resources, wherein a frequency ratio of the second frequency to the first frequency corresponds to an amount ratio of the predicted amount to the recurring amount, and wherein a predicted balance of the auxiliary source, at the second frequency, when transformed using the resource transformation engine corresponds to the predicted amount; and provide information to the user that an alternative resource distribution at the second frequency for the predicted amount and using auxiliary resources corresponds to the recurring resource distribution.

In another aspect, a computer program product for recurring auxiliary resource distribution is presented. The computer program product comprises a non-transitory computer-readable medium comprising code causing a first apparatus to: detect a trigger event associated with a plurality of sources, wherein the plurality of sources comprises a standard source and an auxiliary source, and wherein the plurality of sources is associated with a user; transform, using a resource transformation engine and based on the trigger event, a first amount of auxiliary resources in the auxiliary source to a second amount of standard resources; deduct the first amount of auxiliary resources from a first balance of the auxiliary source; add the second amount of standard resources to a second balance of the standard source; and perform a resource distribution using the second amount of standard resources from the standard source.

In some embodiments, the non-transitory computer-readable medium comprises code causing the first apparatus to, when transforming the first amount of auxiliary resources in the auxiliary source to the second amount of standard resources, multiply the first amount by a fraction to determine the second amount.

In some embodiments, the trigger event comprises the user receiving a resource distribution request for the second amount of standard resources from an entity, and the non-transitory computer-readable medium comprises code causing the first apparatus to, when performing the resource distribution using the second amount of standard resources from the standard source: distribute the second amount of standard resources from the standard source to the entity; and deduct the second amount of standard resources from the second balance of the standard source.

In some embodiments, the non-transitory computer-readable medium comprises code causing the first apparatus to, when performing the resource distribution using the second amount of standard resources from the standard source, distribute the second amount of standard resources from the standard source to another user.

In yet another aspect, a method for recurring auxiliary resource distribution is presented. The method comprises detecting a trigger event associated with a plurality of sources, wherein the plurality of sources comprises a standard source and an auxiliary source, and wherein the plurality of sources is associated with a user; transforming, using a resource transformation engine and based on the trigger event, a first amount of auxiliary resources in the auxiliary source to a second amount of standard resources; deducting the first amount of auxiliary resources from a first balance of the auxiliary source; adding the second amount of standard resources to a second balance of the standard source; and performing a resource distribution using the second amount of standard resources from the standard source.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
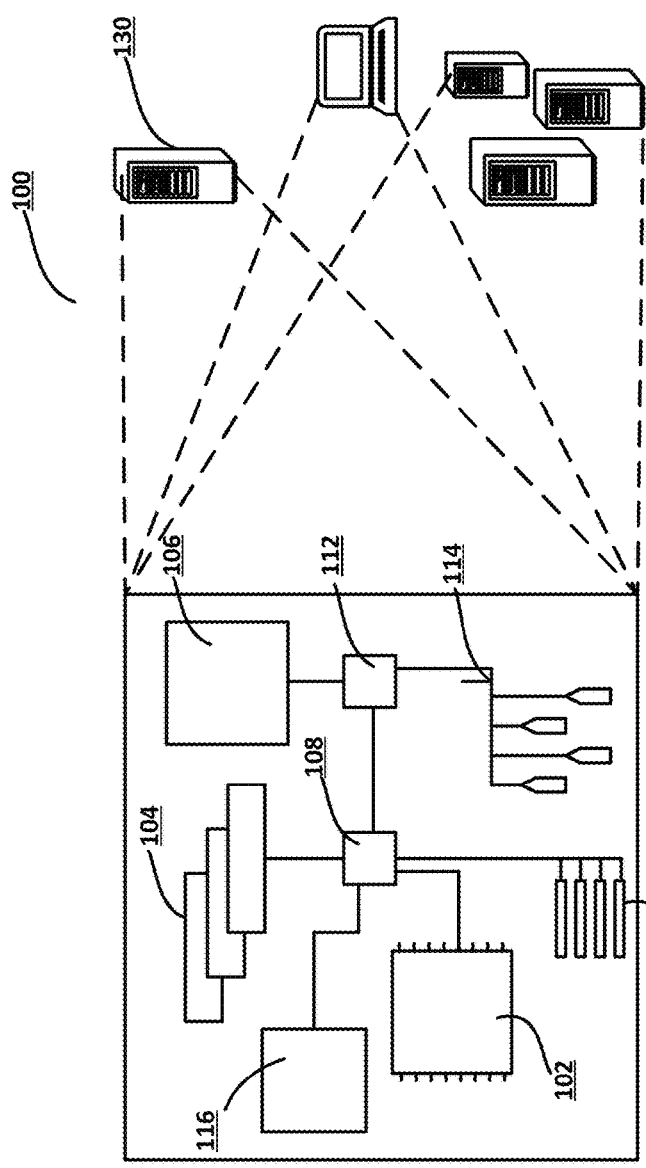
Figure 1:
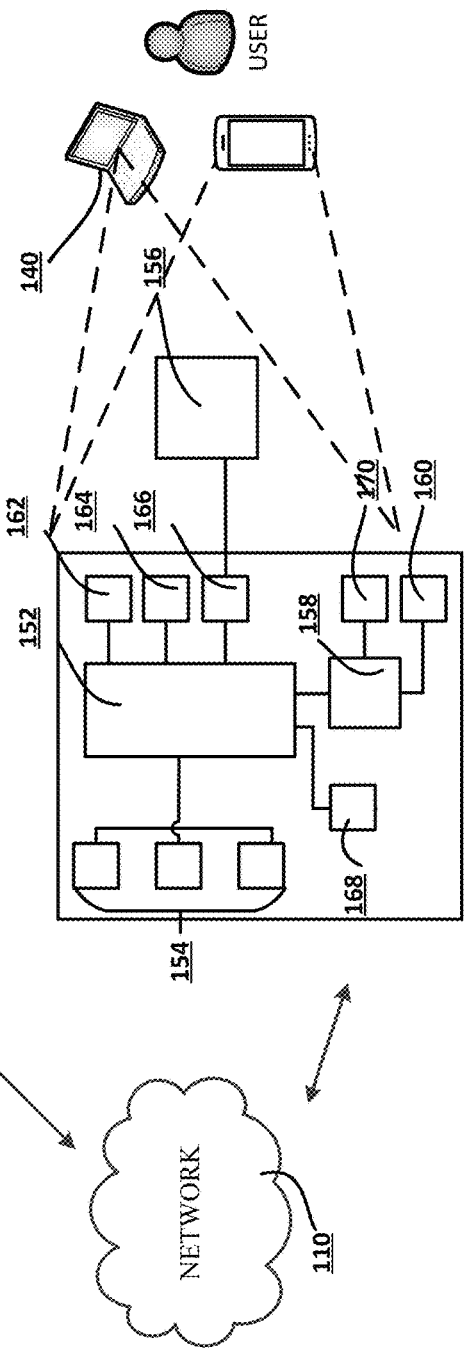
Figure 2:
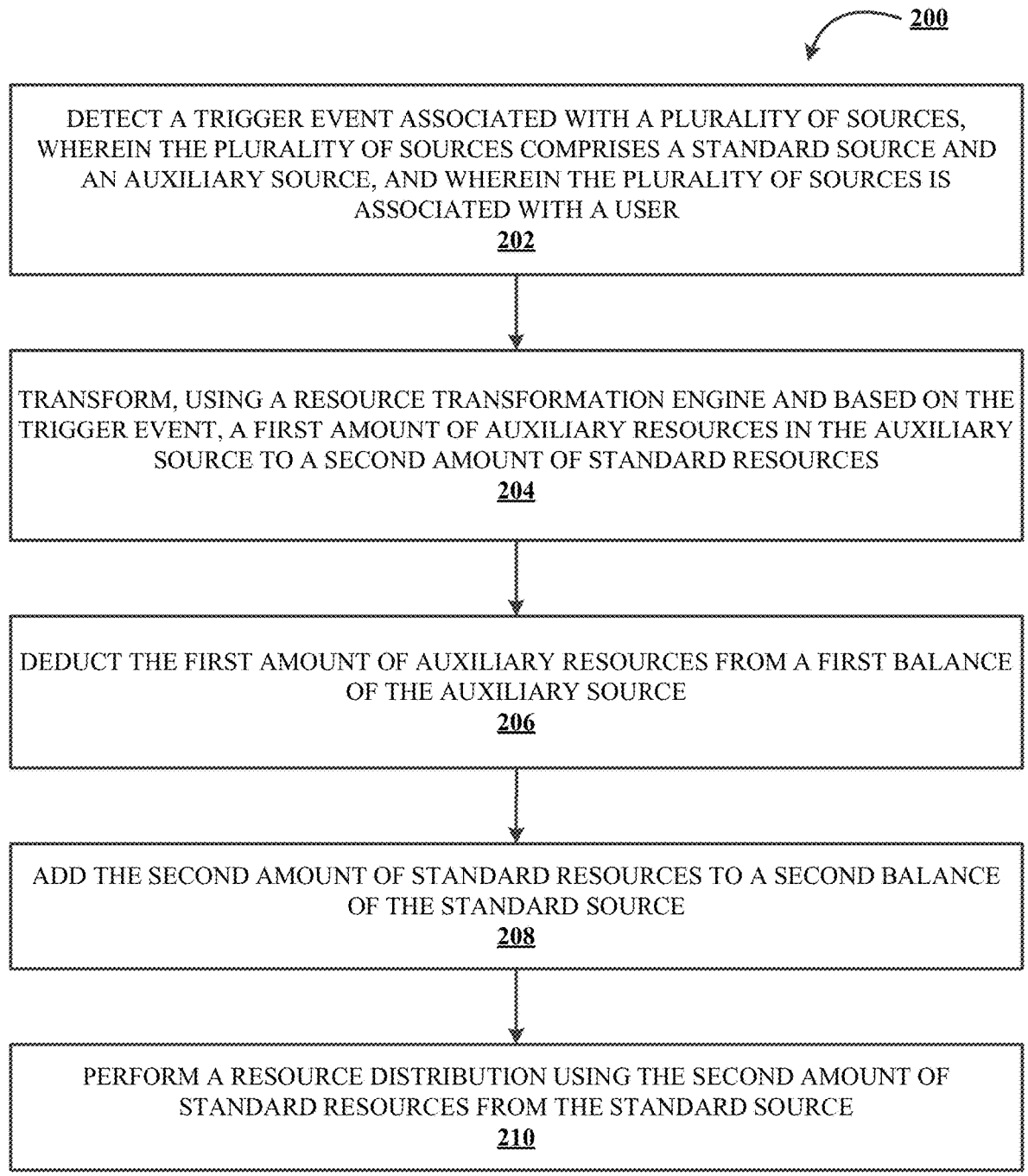

Having thus described embodiments of the invention in general terms, reference will now be made the accompanying drawings, wherein:

FIG. 1 illustrates technical components of a system for recurring auxiliary resource distribution, in accordance with an embodiment of the invention; and FIG. 2 illustrates a process flow for recurring auxiliary resource distribution, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "resource" may generally refer to objects, products, devices, goods, commodities, services, offers, discounts, and the like, and/or the ability and opportunity to access and use the same. As used herein, a "standard resource" may generally refer to a resource having a defined monetary value, such as currency, cash, a cash equivalent, and/or the like. As used herein, an "auxiliary resource" may generally refer to a resource such as a reward, a reward point, a benefit reward, a bonus mile, cash back, a credit, and/or the like, which, in some example implementations, may be provided to a user by an entity (e.g., a financial institution, a card management entity, and/or the like) for using a payment instrument associated with the entity (e.g., for a resource transfer). Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "source" may generally refer to an account, a system, and/or the like associated with a user and/or a type of resources (e.g., standard resources, auxiliary resources, and/or the like). As used herein, a "standard source" may generally refer to a source associated with standard resources, such as a checking account, a deposit account, a savings account, a credit account, and/or the like. As used herein, an "auxiliary source" may generally refer to a source associated with auxiliary resources, such as a rewards account, a rewards points account, a benefit rewards account, a bonus miles account, a cash back account, and/or the like. Some example implementations include one or more sources associated with a user, where the one or more sources include one or more standard sources, one or more auxiliary sources, and/or the like. In some example implementations, an auxiliary source associated with a user may be associated with a standard source associated with the user. For example, an entity, such as a financial entity managing the standard source and the auxiliary source, may increase a balance of auxiliary resources in the auxiliary source based on the user performing one or more actions using standard resources in the standard source (e.g., conducting a transaction and/or distribution using the standard source, maintaining a particular balance in the standard source, receiving information regarding the standard source in a particular format, and/or the like).

As used herein, a "distribution," such as a resource distribution, an auxiliary resource distribution, and/or the like, may refer to any transaction, activities, or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (e.g., paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. In some embodiments, the payment instrument may not be a "card" and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of a system environment for recurring auxiliary resource distribution within a technical environment, in accordance with an embodiment of the invention. FIG. 1 provides a unique system 100 that includes specialized servers and system communicably linked across a distributive network of nodes required to perform the functions of the process flows described herein in accordance with embodiments of the present invention.

As illustrated, the system environment includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers and/or resource distributions using one or more applications stored thereon. The one or more applications may be configured to communicate with the system 130, execute a transaction, input information onto a user interface presented on the user input system 140, and/or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including mobile-side and server-side processes for installing a computer program from a mobile device to a computer, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, and/or the like. The components shown here, their connections and relationships, and their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 or on the storage device 106 to display graphical information for a GUI on an external input/output device, such as display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be a server managed by an entity, such as a business, a merchant, a financial institution, a card management institution, and/or the like. The system 130 may be located at a facility associated with the entity or remotely from the facility associated with the entity.

The memory 104 may store information within the system 130. In one implementation, the memory 104 may be a volatile memory unit or units, such as volatile random access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer-readable or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application, and allows memory reuse for better utilization of the memory resources when the data sizes are large.

The high-speed interface 108 may manage bandwidth-intensive operations for the system 130, while the low speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low speed interface 112 and/or controller is coupled to storage device 106 and low speed bus 114 (e.g., expansion port). The low speed bus 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and an user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and digital processors. The processor 152 may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, or other appropriate display technology. An interface of the display 156 may include appropriate circuitry, and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140, and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, or other such transceiver (not shown). Additionally, or alternatively, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Computer programs (e.g., also referred to as programs, software, software applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user can provide input to the computer, and/or a pointing device (e.g., a mouse or a trackball) by which the user can provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, or front end components. Components of the system may be interconnected by any form or medium of digital data communication (e.g., a communication network). Examples of communication networks include a local area network ("LAN"), a wide area network ("WAN"), and the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment illustrated in FIG. 1 is exemplary and other embodiments may vary. As another example, in some embodiments, the system 130 includes more, less, or different components. As another example, in some embodiments, some or all of the portions of the system 100 may be combined into a single portion. Likewise, in some embodiments, some or all of the portions of the system 130 may be separated into two or more distinct portions.

FIG. 2 illustrates a process flow 200 for recurring auxiliary resource distribution within a technical environment, in accordance with an embodiment of the invention. As shown in block 202, the process flow includes detecting a trigger event associated with a plurality of sources, wherein the plurality of sources comprises a standard source and an auxiliary source, and wherein the plurality of sources is associated with a user. In some embodiments, the auxiliary source is a rewards account, and the standard source is a deposit account, a checking account, and/or the like.

In some embodiments, the trigger event may include a first balance of the auxiliary source satisfying a threshold, such as a user-established threshold and/or the like. For example, as the user earns auxiliary resources, the balance of the auxiliary source reaching a certain number (e.g., a maximum threshold and/or the like) may serve as a trigger event. Each time the balance of the auxiliary source reaches the certain number there is a trigger event, thereby establishing a recurring trigger event.

In some embodiments, the trigger event may include a period of time having elapsed since a previous trigger event (e.g., a weekly trigger event, a bi-monthly trigger event, a semi-monthly trigger event, a quarterly trigger event, a yearly trigger event, and/or the like). For example, the user may select a period of time for accumulating and/or earning auxiliary resources before transforming and/or redeeming the auxiliary resources, and the period of time having elapsed may serve as a trigger event for transforming and/or redeeming the auxiliary resources. Each time the period of time passes there is a trigger event, thereby establishing a recurring trigger event.

In some embodiments, the trigger event may include the user receiving a resource distribution request. For example, the user may select a resource distribution request from an entity and/or another user to serve as a trigger event for transforming and/or redeeming auxiliary resources. Each time the entity and/or the other user requests a resource distribution the request serves as a trigger event.

Next, as shown in block 204, the process flow includes transforming, using a resource transformation engine and based on the trigger event, a first amount of auxiliary resources in the auxiliary source to a second amount of standard resources. For example, the process may include multiplying the first amount by a fraction to determine the second amount. In some embodiments, the fraction may correspond to a value of each auxiliary resource, such that, when transformed and/or redeemed auxiliary resources are converted to standard resources based on the value of the auxiliary resources. For example, an entity maintaining the standard source and/or the auxiliary source may establish the fraction and/or value of each auxiliary resource.

Next, as shown in block 206, the process flow includes deducting the first amount of auxiliary resources from a first balance of the auxiliary source. For example, the process may include deducting the amount of transformed auxiliary resources from the auxiliary source.

Next, as shown in block 208, the process flow includes adding the second amount of standard resources to a second balance of the standard source. For example, the process may include adding, to the standard source, the amount of standard resources generated by transforming the auxiliary resources.

Next, as shown in block 210, the process flow includes performing a resource distribution using the second amount of standard resources from the standard source. For example, the process may include performing a resource distribution request using the amount of standard resources generated by transforming the auxiliary resources. Additionally, or alternatively, the process may include performing a resource distribution request using the amount of standard resources generated by transforming the auxiliary resources and another amount of standard resources.

In some embodiments, the trigger event may include the user receiving a resource distribution request for the second amount of standard resources from an entity, and the process may include, when performing the resource distribution using the second amount of standard resources from the standard source, distributing the second amount of standard resources from the standard source to the entity and deducting the second amount of standard resources from the second balance of the standard source. For example, when an entity and/or another user requests a resource distribution for a requested amount, the process may include transforming auxiliary resources in the auxiliary source to generate the requested amount of standard resources in the standard source, distributing the requested amount of standard resources to the entity and/or the other user, and deducting the requested amount from the standard source. In this way, the process may use transformed auxiliary resources to complete a resource distribution in response to a resource distribution request.

In some embodiments, the trigger event may include the user receiving a resource distribution request for a third amount of standard resources from an entity, and the process may include, when performing the resource distribution using the second amount of standard resources from the standard source, distributing the second amount of standard resources and a fourth amount of standard resources from the standard source to the entity, where the fourth amount is a difference between the third amount and the second amount, and deducting the second amount of standard resources and the fourth amount of standard resources from the second balance of the standard source. For example, when an entity and/or another user requests a resource distribution for a requested amount, the process may include transforming auxiliary resources in the auxiliary source to generate a partial amount of standard resources in the standard source, where the partial amount is less than the requested amount, distributing, using the partial amount and an amount of standard resources equal to a difference between the requested amount and the partial amount, the requested amount of standard resources to the entity and/or the other user, and deducting the requested amount from the standard source. In this way, the process may use transformed auxiliary resources and/or standard resources to complete a resource distribution in response to a resource distribution request.

In some embodiments, the process flow may include receiving user input identifying a threshold for the first balance of the auxiliary source and a source associated with a recipient user. For example, the user may provide user input identifying a maximum balance of auxiliary resources in the auxiliary source and a source associated with a recipient user. In such an embodiment, the trigger event may include the first balance of the auxiliary source satisfying the threshold, and, when performing the resource distribution using the second amount of standard resources from the standard source, the process flow may include distributing the second amount of standard resources from the standard source to the source associated with recipient user. For example, when the auxiliary resources in the auxiliary source meets and/or exceeds the maximum balance identified by the user input, the process may include transforming an amount of auxiliary resources (e.g., a user-established amount and/or the like) in the auxiliary source, and distributing, to the account of the recipient user, standard resources generated by transforming the auxiliary resources.

In some embodiments, the process flow may include (e.g., using machine learning and/or a forecasting model) identifying, based on historical data of resource distributions from the standard source, a recurring resource distribution that is repeated at a first frequency for a recurring amount, determining, based on historical data of the first balance of the auxiliary source, a second frequency and a predicted amount of standard resources, wherein a frequency ratio of the second frequency to the first frequency corresponds to an amount ratio of the predicted amount to the recurring amount, and wherein a predicted balance of the auxiliary source, at the second frequency, when transformed using the resource transformation engine corresponds to the predicted amount, and providing information to the user that an alternative resource distribution at the second frequency for the predicted amount and using auxiliary resources corresponds to the recurring resource distribution. For example, the user may distribute X standard resources to another user once a week, and the system may identify, using machine learning, that the resource distribution is a recurring resource distribution. In such an example, the system may (e.g., using machine learning and/or a forecasting model) determine, based on historical data regarding the user (e.g., a balance of the auxiliary source, a balance of the standard source, resource distributions associated with the user, and/or the like), that, if the user distributed, to the other user, two times X standard resources (2X standard resources) every two weeks, the balance of the auxiliary source would be such that auxiliary resources may be transformed to 2X standard resources every two weeks. Thus, rather than using standard resources for the recurring resource distribution, the user may use auxiliary resources for the recurring resource distribution if the frequency and amount of the recurring resource distribution is restructured. Furthermore, the system may provide a message, notification, alert, email, physical mail, and/or the like to the user to explain, suggest, describe, and/or the like the restructured recurring resource distribution.

In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, an LDA, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating data relevant to the system 130. In some embodiments, the one or more machine learning algorithms may be predictive modeling algorithms configured to use data and statistics to predict outcomes with forecasting models.

In some embodiments, the forecasting model may be generated by training on data regarding the user (e.g., a balance of the auxiliary source, a balance of the standard source, resource distributions associated with the user, and/or the like) over a predetermined past period of time. In doing so, the system may be configured to determine which of the future resources (e.g., auxiliary resources, standard resources, and/or the like) will be available to the user, and which of those available future resources will be accessible for the user. In some other embodiments, the system may be configured to determine that all the future resources will be available to the user, but determine which of those future resources will be accessible for the user. For example, the forecasting model may predict that all the auxiliary resources and/or standard resources are available to the user, but the user is eligible to access only a subset of the auxiliary resources and/or standard resources at a predetermined future time. It is possible that in time, the auxiliary resources and/or standard resources accessible for the user will increase. In some embodiments, the one or more machine learning algorithms may be used to calculate the probability that the one or more future resources will be available for the user, and the probability that a particular future resource will be available to the user and the probability that the user will be capable of accessing them at the predetermined future time.

A financial institution may provide reward points to a user for utilizing cash and/or credit associated with the financial institution to complete a transaction. The reward points may be associated with a reward account associated with the user and maintained by the financial institution. However, tracking and maintaining reward points and rewards accounts consumes computing resources (e.g., processing resources, memory resources, power resources, communication resources, and/or the like) and/or network resources. Accordingly, when rewards points are not utilized by users, the computing resources and/or network resources consumed tracking and maintaining the reward points and rewards accounts are wasted. The financial institution may provide the reward points to improve the satisfaction of the user with the financial institution, encourage the user to complete additional resource distributions using accounts associated with the financial institution, and/or the like. However, when the user does not utilize the reward points, providing the reward points does not improve the satisfaction of the user with the financial institution, encourage the user to complete additional resource distributions using accounts associated with the financial institution, and/or the like. Some embodiments described herein provide a system, a computer program product, and/or a method for generating recurring transactions using reward points and/or providing information to a user about restructuring recurring transactions such that reward points may be used to complete the recurring transactions. By generating recurring transactions using reward points, users utilize the reward points, and the system conserves the computing resources and/or network resources used for tracking and maintaining the reward points and rewards accounts that would otherwise be wasted.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for recurring auxiliary resource distribution, the system comprising:
   at least one processing device;
   a communication interface in communication with the at least one processing device;
   a display for presenting information to a user, wherein the display is in communication with the at least one processing device;
   a control interface for receiving commands from the user and converting the received commands for submission to the at least one processing device, wherein the control interface is in communication with the at least one processing device; and
   at least one non-transitory storage device comprising computer-executable program code that, when executed by the at least one processing device, causes the at least one processing device to:
      train, using historical data associated with a plurality of sources associated with the user, the plurality of sources comprising a standard source and an auxiliary source, a machine learning model to determine predicted amounts of standard resources in the standard source and auxiliary resources in the auxiliary source that will be available to the user;
      identify, based on historical data of resource distributions from the standard source, a recurring resource distribution that is repeated at a first frequency for a recurring amount;
      determine, using the machine learning model, a second frequency and a predicted amount of standard resources, wherein a frequency ratio of the second frequency to the first frequency corresponds to an amount ratio of the predicted amount to the recurring amount, and wherein a predicted balance of the auxiliary source, at the second frequency, when transformed using a resource transformation engine corresponds to the predicted amount;
      display, using the display and to the user, a graphical user interface comprising a notification, wherein the notification comprises information describing that an alternative resource distribution at the second frequency for the predicted amount and using auxiliary resources corresponds to the recurring resource distribution;
      receive, using the control interface, user input to the graphical user interface, wherein the user input comprises confirmation of the alternative resource distribution and a trigger event for the alternative resource distribution, wherein the trigger event repeats at the second frequency;
      detect, after receiving the user input, the trigger event;
      transform, using the resource transformation engine and based on the trigger event, a first amount of auxiliary resources in the auxiliary source, wherein the first amount corresponds to the predicted balance, to the predicted amount of standard resources;
      deduct the first amount of auxiliary resources from a first balance of the auxiliary source;
      add the predicted amount of standard resources to a second balance of the standard source; and
      transmit, using the communication interface and to a transaction processing system, data comprising a request to perform the recurring resource distribution using the predicted amount of standard resources from the standard source.

2. The system of claim 1, wherein another trigger event comprises the first balance of the auxiliary source satisfying a threshold, and wherein the at least one non-transitory storage device comprises computer-executable code that, when executed by the at least one processing device, causes the at least one processing device to:
   transform, using the resource transformation engine and based on the other trigger event, a third amount of auxiliary resources in the auxiliary source to a fourth amount of standard resources;
   deduct the third amount of auxiliary resources from the first balance of the auxiliary source;
   add the fourth amount of standard resources to the second balance of the standard source; and
   transmit, using the communication interface and to the transaction processing system, other data comprising another request to perform a resource distribution using the fourth amount of standard resources from the standard source.

3. The system of claim 1, wherein the trigger event comprises a period of time having elapsed since a previous trigger event, wherein the period of time corresponds to the second frequency.

4. The system of claim 1, wherein another trigger event comprises the user receiving a resource distribution request, and wherein the at least one non-transitory storage device comprises computer-executable code that, when executed by the at least one processing device, causes the at least one processing device to:
   transform, using the resource transformation engine and based on the other trigger event, a third amount of auxiliary resources in the auxiliary source to a fourth amount of standard resources;
   deduct the third amount of auxiliary resources from the first balance of the auxiliary source;
   add the fourth amount of standard resources to the second balance of the standard source; and
   transmit, using the communication interface and to the transaction processing system, other data comprising another request to perform a resource distribution using the fourth amount of standard resources from the standard source.

5. The system of claim 1, wherein the at least one non-transitory storage device comprises computer-executable code that, when executed by the at least one processing device, causes the at least one processing device to, when transforming the first amount of auxiliary resources in the auxiliary source to the predicted amount of standard resources, multiply the first amount by a fraction to determine the predicted amount.

6. The system of claim 1, wherein another trigger event comprises the user receiving a resource distribution request for a third amount of standard resources from an entity; and
   wherein the at least one non-transitory storage device comprises computer-executable code that, when executed by the at least one processing device, causes the at least one processing device to:
      transform, using the resource transformation engine and based on the other trigger event, a fourth amount of auxiliary resources in the auxiliary source to the third amount of standard resources;
      deduct the fourth amount of auxiliary resources from the first balance of the auxiliary source;
      distribute the third amount of standard resources from the standard source to the entity; and
      deduct the third amount of standard resources from the second balance of the standard source.

7. The system of claim 1, wherein the request to perform the recurring resource distribution using the predicted amount of standard resources from the standard source comprises instructions to distribute the predicted amount of standard resources from the standard source to another user.

8. The system of claim 1, wherein the auxiliary source is a rewards account; and
wherein the standard source is a deposit account.

9. The system of claim 1, wherein the at least one non-transitory storage device comprises computer-executable code that, when executed by the at least one processing device, causes the at least one processing device to:
receive, using the control interface, user input identifying:
a threshold for the first balance of the auxiliary source; and
a source associated with a recipient user;
wherein another trigger event comprises the first balance satisfying the threshold; and
wherein the at least one non-transitory storage device comprises computer-executable code that, when executed by the at least one processing device, causes the at least one processing device to:
transform, using the resource transformation engine and based on the other trigger event, a third amount of auxiliary resources in the auxiliary source to a fourth amount of standard resources;
deduct the third amount of auxiliary resources from the first balance of the auxiliary source;
add the fourth amount of standard resources to the second balance of the standard source; and
transmit, using the communication interface and to the transaction processing system, other data comprising another request to distribute the fourth amount of standard resources from the standard source to the source associated with recipient user.

10. A computer program product for recurring auxiliary resource distribution, the computer program product comprising a non-transitory computer-readable medium comprising code that, when executed by a first apparatus, causes the first apparatus to:
train, using historical data associated with a plurality of sources associated with a user, the plurality of sources comprising a standard source and an auxiliary source, a machine learning model to determine predicted amounts of standard resources in the standard source and auxiliary resources in the auxiliary source that will be available to the user;
identify, based on historical data of resource distributions from the standard source, a recurring resource distribution that is repeated at a first frequency for a recurring amount;
determine, using the machine learning model, a second frequency and a predicted amount of standard resources, wherein a frequency ratio of the second frequency to the first frequency corresponds to an amount ratio of the predicted amount to the recurring amount, and wherein a predicted balance of the auxiliary source, at the second frequency, when transformed using a resource transformation engine corresponds to the predicted amount;
display, using a display of the first apparatus and to the user, a graphical user interface comprising a notification, wherein the notification comprises information describing that an alternative resource distribution at the second frequency for the predicted amount and using auxiliary resources corresponds to the recurring resource distribution;

receive, using a control interface of the first apparatus, user input to the graphical user interface, wherein the user input comprises confirmation of the alternative resource distribution and a trigger event for the alternative resource distribution, wherein the trigger event repeats at the second frequency, wherein the control interface is configured to receive commands from the user and convert the received commands for submission to at least one processing device of the first apparatus;
detect, after receiving the user input, the trigger event;
transform, using the resource transformation engine and based on the trigger event, a first amount of auxiliary resources in the auxiliary source, wherein the first amount corresponds to the predicted balance, to the predicted amount of standard resources;
deduct the first amount of auxiliary resources from a first balance of the auxiliary source;
add the predicted amount of standard resources to a second balance of the standard source; and
transmit, using a communication interface of the first apparatus and to a transaction processing system, data comprising a request to perform the recurring resource distribution using the predicted amount of standard resources from the standard source.

11. The computer program product of claim 10, wherein another trigger event comprises the first balance of the auxiliary source satisfying a threshold, wherein the non-transitory computer-readable medium comprises code that, when executed by the first apparatus, causes the first apparatus to:
transform, using the resource transformation engine and based on the other trigger event, a third amount of auxiliary resources in the auxiliary source to a fourth amount of standard resources;
deduct the third amount of auxiliary resources from the first balance of the auxiliary source;
add the fourth amount of standard resources to the second balance of the standard source; and
transmit, using the communication interface and to the transaction processing system, other data comprising another request to perform a resource distribution using the fourth amount of standard resources from the standard source.

12. The computer program product of claim 10, wherein the trigger event comprises a period of time having elapsed since a previous trigger event, wherein the period of time corresponds to the second frequency.

13. The computer program product of claim 10, wherein another trigger event comprises the user receiving a resource distribution request, and wherein the non-transitory computer-readable medium comprises code that, when executed by the first apparatus, causes the first apparatus to:
transform, using the resource transformation engine and based on the other trigger event, a third amount of auxiliary resources in the auxiliary source to a fourth amount of standard resources;
deduct the third amount of auxiliary resources from the first balance of the auxiliary source;
add the fourth amount of standard resources to the second balance of the standard source; and
transmit, using the communication interface and to the transaction processing system, other data comprising another request to perform a resource distribution using the fourth amount of standard resources from the standard source.

14. The computer program product of claim 10, wherein the non-transitory computer-readable medium comprises code that, when executed by the first apparatus, causes the first apparatus to, when transforming the first amount of auxiliary resources in the auxiliary source to the predicted amount of standard resources, multiply the first amount by a fraction to determine the predicted amount.

15. The computer program product of claim 10, wherein another trigger event comprises the user receiving a resource distribution request for a third amount of standard resources from an entity; and
   wherein the non-transitory computer-readable medium comprises code that, when executed by the first apparatus, causes the first apparatus to:
      transform, using the resource transformation engine and based on the other trigger event, a fourth amount of auxiliary resources in the auxiliary source to the third amount of standard resources;
      deduct the fourth amount of auxiliary resources from the first balance of the auxiliary source;
      distribute the third amount of standard resources from the standard source to the entity; and
      deduct the third amount of standard resources from the second balance of the standard source.

16. The computer program product of claim 10, wherein the request to perform the recurring resource distribution using the predicted amount of standard resources from the standard source comprises instructions to distribute the predicted amount of standard resources from the standard source to another user.

17. The computer program product of claim 10, wherein the auxiliary source is a rewards account; and
   wherein the standard source is a deposit account.

18. A method for recurring auxiliary resource distribution, the method comprising:
   training, using historical data associated with a plurality of sources associated with a user, the plurality of sources comprising a standard source and an auxiliary source, a machine learning model to determine predicted amounts of standard resources in the standard source and auxiliary resources in the auxiliary source that will be available to the user;
   identifying, based on historical data of resource distributions from the standard source, a recurring resource distribution that is repeated at a first frequency for a recurring amount;
   determining, using the machine learning model, a second frequency and a predicted amount of standard resources, wherein a frequency ratio of the second frequency to the first frequency corresponds to an amount ratio of the predicted amount to the recurring amount, and wherein a predicted balance of the auxiliary source, at the second frequency, when transformed using a resource transformation engine corresponds to the predicted amount;
   displaying, using a display of a user input system and to the user, a graphical user interface comprising a notification, wherein the notification comprises information describing that an alternative resource distribution at the second frequency for the predicted amount and using auxiliary resources corresponds to the recurring resource distribution;
   receiving, using a control interface of the user input system, user input to the graphical user interface, wherein the user input comprises confirmation of the alternative resource distribution and a trigger event for the alternative resource distribution, wherein the trigger event repeats at the second frequency, wherein the control interface is configured to receive commands from the user and convert the received commands for submission to at least one processing device of the user input system;
   detecting, after receiving the user input, the trigger event;
   transforming, using the resource transformation engine and based on the trigger event, a first amount of auxiliary resources in the auxiliary source, wherein the first amount corresponds to the predicted balance, to the predicted amount of standard resources;
   deducting the first amount of auxiliary resources from a first balance of the auxiliary source;
   adding the predicted amount of standard resources to a second balance of the standard source; and
   transmitting, using a communication interface of the user input system and to a transaction processing system, data comprising a request to perform the recurring resource distribution using the predicted amount of standard resources from the standard source.

19. The method of claim 18, wherein another trigger event comprises the first balance of the auxiliary source satisfying a threshold, and wherein the method comprises:
   transforming, using the resource transformation engine and based on the other trigger event, a third amount of auxiliary resources in the auxiliary source to a fourth amount of standard resources;
   deducting the third amount of auxiliary resources from the first balance of the auxiliary source;
   adding the fourth amount of standard resources to the second balance of the standard source; and
   transmitting, using the communication interface and to the transaction processing system, other data comprising another request to perform a resource distribution using the fourth amount of standard resources from the standard source.

20. The method of claim 18, wherein the trigger event comprises a period of time having elapsed since a previous trigger event, wherein the period of time corresponds to the second frequency.

* * * * *